Feb. 10, 1931.   A. J. PENICK ET AL   1,791,971
PISTON
Filed Oct. 9, 1928

Inventors
Arthur J. Penick
Kirby T. Penick
By
Hardway Cathey
Attorneys

Patented Feb. 10, 1931

1,791,971

UNITED STATES PATENT OFFICE

ARTHUR J. PENICK AND KIRBY T. PENICK, OF HOUSTON, TEXAS

PISTON

Application filed October 9, 1928. Serial No. 311,301.

This invention relates to new and useful improvements in a piston.

One object of the invention is to provide a piston of the character described adapted to work in a cylinder and to form a close fit therewith, and which is composed of assembled parts so secured together that worn parts may be readily removed and renewed.

Another object of the invention is to provide a piston of the character described specially designed for use on slush pumps and of such construction that it will form a leak tight fit with the cylinder walls and at the same time will be very durable and will not readily wear away.

With the above and other objects in view this invention has particular relation to certain novel features of construction, operation and arrangement of parts an example of which is given in this specification and illustrated in the accompanying drawings, wherein:—

Figure 1:
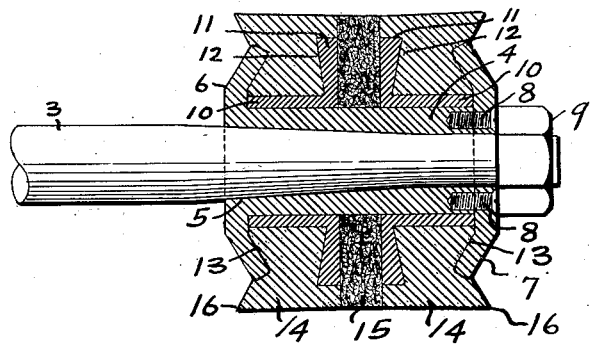
Figure 1 shows a longitudinal sectional view of the piston.
Figure 2:
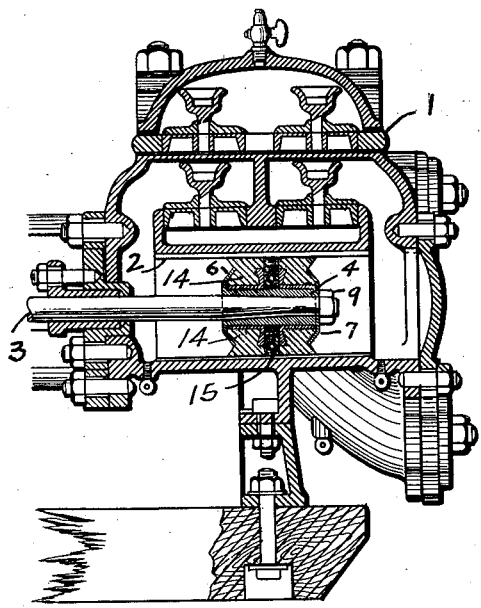
Figure 2 shows a longitudinal sectional view of a pump showing the piston therein.
Figure 3:
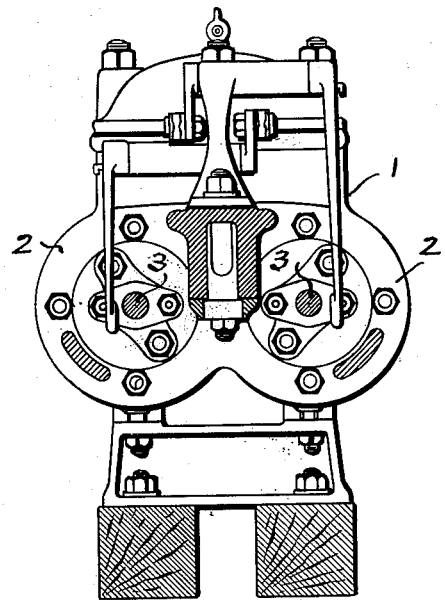
Figure 3 shows a cross sectional view of the pump.

Referring now more particularly to the drawings, wherein like numerals of reference designate similar parts in each of the figures, the numeral 1 designates the pump, as a whole, which has the cylinders 2, 2. Each cylinder has a piston therein which is mounted on the piston rod 3 and which will now be described.

The piston has a sleeve 4 which has an axial tapering bearing 5 therethrough to receive the correspondingly tapered end of the rod 3. This sleeve has the annular end plates 6, 7, attached thereto the latter of which is removable and may be secured to sleeve end in any desired manner as by set screws 8, 8. The piston may be secured on the rod 3 in any desired manner, as by means of a nut 9, screwed onto the end of said rod and abutting the end plate 7.

On the sleeve 4 are the tubular liners 10, 10 whose outer ends abut the respective end plates 6, 7, and whose other ends are formed with the annular confronting clamp flanges 11, 11 which are spaced apart.

The margins of the end plates 6, 7 are inwardly turned and the facing sides 12, 12 of the clamp flanges converge outwardly toward the respective inwardly turned margins of the end plates 6, 7 thus forming annular dovetailed grooves 13, 13 in which are fitted the rings 14, 14, formed of rubber or some other suitable material.

The inwardly turned margins of the plates 6, 7, and likewise the clamp flanges 11, 11 are counter sunk into said respective rings 14.

Fitted between the flanges 11 there is a spacer ring 15, preferably formed of fiber but which may be formed of any suitable material and whose external surface is yieldable.

The outer ends of the respective rings 14, 14 are flared beyond the margins of the plates 6, 7, as at 16, 16.

As the piston is forced against the fluid in the cylinder the resistance of said fluid will force said flared ends 16, 16 out closely against the cylinder walls to form a close fit therewith and to prevent leakage past the piston.

While we have shown what we now consider the preferred form of the invention, it is obvious that mechanical changes may be made therein and equivalents substituted for the parts shown and we reserve the right to make such changes and substitutions within the principle of the invention.

What we claim is:—

1. A piston including a support, end plates therefor, liners on the support whose outer ends abut the corresponding end plates, annular clamp flanges carried by the inner ends of said liners and spaced apart, rings of resilient material between said end plates and the corresponding clamp flanges and a fibrous ring between said clamp flanges.

2. A piston including a sleeve, end plates associated therewith, one of which is removable, liners spaced apart on the sleeve, a clamp flange at the inner end of each liner, a ring of yieldable material between said flanges, and a ring of yieldable material between each flange and its opposing end plate.

3. A piston including a sleeve, end plates at the respective ends of the sleeve, one of which is removable, liners spaced apart on the sleeve, a clamp flange at the inner end of each liner, a ring of yieldable material between said flanges, and a ring of yieldable material between each flange and its opposing end plate, said rings adjacent said end plates extending beyond the margins of said plates, said extended portions being outwardly flared.

4. A piston including a support having end plates whose inner faces converge inwardly, spacer sleeves on the support having confronting clamp flanges spaced apart, each flange converging toward the corresponding end plate and forming therewith an annular dovetailed groove, resilient rings in said grooves and a spacer ring between said flanges.

5. A piston including a support having end plates whose margins are inwardly turned, spacer sleeves on the support having confronting clamp flanges spaced apart, each flange converging toward the corresponding end plate and forming therewith an annular dovetailed groove, resilient rings in said grooves and a spacer ring between said flanges, said resilient rings being extended beyond the corresponding end plates and outwardly flared.

6. A pump piston including an axial supporting member, end plates at the ends of said supporting member, one of which is removable, a clamp flange spaced inwardly from each plate forming an annular groove between each end plate and its corresponding flange, a spacer ring between said flanges and a resilient ring in said grooves.

7. A pump piston including an axial supporting member, end plates at the ends of said supporting member, one of which is removable, a clamp flange spaced inwardly from each plate forming an annular groove between each end plate and its corresponding flange, a spacer ring between said flanges and a resilient ring in said grooves, each end plate and flange being counter-sunk into its adjacent resilient ring.

8. A pump piston including an axial supporting member, end plates at the ends of said supporting member, a clamp flange spaced inwardly from each plate forming an annular groove between each end plate and its corresponding flange, a spacer ring between said flanges and a resilient ring in said grooves, each ring being extended beyond its adjacent end plate, said extended portions being outwardly flared.

9. A piston including a supporting body, radial end plates therefor, whose margins converge inwardly, rings of resilient material on the body adjacent the inner sides of said plates and provided to form a packing between the piston and a cylindrical surface, and a spacer ring formed of yieldable material between said resilient rings, the outer surfaces of all the rings being substantially flush to contact with said surface.

10. A piston including a supporting body, radial end plates therefor, rings of resilient material on the body, one adjacent the inner side of each plate and provided to form a packing between the piston and a cylindrical surface, a clamp flange engaging the inner side of each resilient ring, and a spacer ring between said resilient rings, the external surface of said spacer ring being yieldable and the external surface of all of said rings being substantially flush to contact with said surface.

In testimony whereof we have signed our names to this specification.

ARTHUR J. PENICK.
KIRBY T. PENICK.